United States Patent
Chen et al.

(10) Patent No.: US 10,432,315 B2
(45) Date of Patent: Oct. 1, 2019

(54) RING-RESONATOR MODULATION OF AN OPTICAL SIGNAL

(71) Applicant: HEWLETT PACKARD ENTERPRISE DEVELOPMENT LP, Houston, TX (US)

(72) Inventors: Janet Chen, Palo Alto, CA (US); Cheng Li, Palo Alto, CA (US); Marco Fiorentino, Mountain View, CA (US); Raymond G Beausoleil, Seattle, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/745,709

(22) PCT Filed: Jul. 21, 2015

(86) PCT No.: PCT/US2015/041323
§ 371 (c)(1),
(2) Date: Jan. 17, 2018

(87) PCT Pub. No.: WO2017/014753
PCT Pub. Date: Jan. 26, 2017

(65) Prior Publication Data
US 2018/0212682 A1    Jul. 26, 2018

(51) Int. Cl.
*G02F 1/01* (2006.01)
*G02B 6/293* (2006.01)
(Continued)

(52) U.S. Cl.
CPC ..... *H04B 10/50572* (2013.01); *G02F 1/0121* (2013.01); *G02F 1/025* (2013.01);
(Continued)

(58) Field of Classification Search
CPC ........ H04B 10/50572; H04B 10/25755; H04B 10/5051; H04B 10/506; H04B 10/675;
(Continued)

(56) References Cited

U.S. PATENT DOCUMENTS 7,061,944 B2 * 6/2006 DeCusatis ............ H04B 10/506
372/18
7,085,499 B2 * 8/2006 Yap ...................... G02B 6/2861
398/161
(Continued)

FOREIGN PATENT DOCUMENTS

EP          1708324 A2    10/2006
KR    20150013894 A      2/2015

OTHER PUBLICATIONS

Cheng Li, "An Energy-Efficient Silicon Microring Resonator-Based Photonic Transmitter," HP Labs, 2014, 9 pages, www.hpl.hp.com/techreports/2014/HPL-2014-21.pdf.
(Continued)

Primary Examiner — Abbas H Alagheband
(74) Attorney, Agent, or Firm — Hewlett Packard Enterprise Patent Department

(57) ABSTRACT

One example includes an optical transmitter system. The system includes a waveguide to receive and propagate an optical signal. The system also includes a ring modulation system comprising a ring resonator that is optically coupled to the waveguide and is to resonate a given wavelength of the optical signal in response to an input data signal that is provided to a modulation amplifier to provide carrier injection to change a refractive index of the ring resonator to resonate the given wavelength of the optical signal to modulate the optical signal. The system further includes a tuning controller associated with the ring modulation system. The tuning controller can implement iterative feedback tuning of the ring modulation system based on a relative
(Continued)

amplitude of an optical intensity of the given wavelength in the ring resonator and a variable reference amplitude to substantially stabilize the ring resonator with respect to the given wavelength.

7 Claims, 4 Drawing Sheets

(51) Int. Cl.
　　　G02F 1/025　　　(2006.01)
　　　H04B 10/50　　　(2013.01)
　　　H04B 10/67　　　(2013.01)
　　　H04B 10/80　　　(2013.01)
　　　H04B 10/079　　(2013.01)
　　　H04B 10/2575　 (2013.01)
(52) U.S. Cl.
　　　CPC ..... *H04B 10/25755* (2013.01); *H04B 10/506*
　　　　(2013.01); *H04B 10/5051* (2013.01); *H04B*
　　　　*10/675* (2013.01); *H04B 10/801* (2013.01);
　　　　*G02B 6/29338* (2013.01); *G02B 6/29395*
　　　　(2013.01); *G02F 2201/58* (2013.01); *G02F*
　　　　*2203/15* (2013.01); *H04B 10/0799* (2013.01)
(58) Field of Classification Search
　　　CPC .... H04B 10/801; G02B 6/29338; G02B 6/12;
　　　　　　　G02B 6/12007; G02F 1/025; G02F
　　　　　　　1/3132; H01S 3/10; H01S 5/1096; H01S
　　　　　　　5/0085; H01S 5/0287; G05D 25/02;
　　　　　　　　　　　　　　　　　　　　　G05D 19/02
　　　USPC ............................ 398/68, 183, 198, 38, 48
　　　See application file for complete search history.

(56) References Cited

U.S. PATENT DOCUMENTS

| | | | | |
|---|---|---|---|---|
| 7,664,157 | B2* | 2/2010 | Yamazaki | H01S 5/0612 372/94 |
| 7,977,622 | B2* | 7/2011 | McLaren | G02B 6/12007 250/227.11 |
| 8,615,173 | B1* | 12/2013 | Lentine | H04B 10/5057 398/182 |
| 8,625,936 | B1* | 1/2014 | Dong | G02F 1/2257 385/3 |
| 2003/0203717 | A1* | 10/2003 | Chuprun | G06K 13/0825 455/12.1 |
| 2006/0083144 | A1* | 4/2006 | Piede | G02F 1/025 369/100 |
| 2009/0103863 | A1* | 4/2009 | Lee | G02B 6/12007 385/31 |
| 2010/0200733 | A1* | 8/2010 | McLaren | G02B 6/12007 250/214 C |
| 2011/0293216 | A1* | 12/2011 | Lipson | G02B 6/12007 385/14 |
| 2011/0310917 | A1* | 12/2011 | Krishnamoorthy | H01S 5/06821 372/23 |
| 2012/0207479 | A1* | 8/2012 | Krishnamoorthy | H04B 10/506 398/85 |
| 2014/0003761 | A1* | 1/2014 | Dong | G02F 1/2257 385/3 |
| 2014/0016931 | A1* | 1/2014 | Meade | H04Q 11/0005 398/48 |
| 2014/0314406 | A1* | 10/2014 | Zerbe | H04J 14/02 398/38 |
| 2015/0132002 | A1* | 5/2015 | Krishnamurthy | H01S 5/06255 398/79 |
| 2015/0132015 | A1* | 5/2015 | Hayakawa | G02F 1/025 398/200 |
| 2015/0160482 | A1* | 6/2015 | Amberg | G02F 1/0147 385/1 |
| 2015/0277053 | A1* | 10/2015 | Zheng | G02B 6/29341 385/31 |
| 2017/0010485 | A1* | 1/2017 | Amberg | G02F 1/0121 |
| 2018/0212682 | A1* | 7/2018 | Chen | H04B 10/5051 |

OTHER PUBLICATIONS

Chin-Hui Chen, "A WDM Silicon Photonic Transmitter based on Carrier-Injection Microring Modulators," HP Labs, 2014, 2 pages, www hpl hp com/techreports/2014/HPL 2014 11 pdf.

Heyn,P.D., "Robust 4-Channel WDM Demultiplexing Filter Based on Collectively Tuned Silicon Microrings," 9th International Conference on Group IV Photonics (GFP-2012) IEEE May 1, 2012 pp. 75-77, http://www.photonics.ugent.be/download/pub_2976.pdf.

International Search Report & Written Opinion received in PCT Application No. PCT/US2015/041323, dated Apr. 21, 2016, 10 pages.

Knights, A.P., "Comb-Laser Driven WDM for Short Reach Silicon Photonic Based Optical Interconnection," The 9th International Conference on Group IV Photonics (GFP) Aug. 29-31, 2012, pp. 210-212, http://ieeexplore.ieee.org/xpl/articleDetails.jsp?tp=&arnumber=6324136&url=http%3A%2F%2Fwww%2Eopticsinfobase%2Eorg%2FDirectPDFAccess%2F8E6FF433-08B0-397E-B906ABE3CEA7D1E7_222909%2Foe-19-21-20435%2Epdf%3Fda%3D1%26id%3D222909%26seq%3D0%26mobile%3Dno&org.

Li, G., "25Gb/s 1V-driving CMOS ring modulator with integrated thermal tuning," Optics Express 19.21, Oct. 10, 2011, pp. 20435-20443, http://www.opticsinfobase.org/view_article.cfm?gotourl=http%3A%2F%2Fwww%2Eopticsinfobase%2Eorg%2FDirectPDFAccess%2F8E6FF433-08B0-397E-B906ABE3CEA7D1E7_222909%2Foe-19-21-20435%2Epdf%3Fda%3D1%26id%3D222909%26seq%3D0%26mobile%3Dno&org.

Manipatruni, S., "Ultra High Bandwidth WDM Using Silicon Microring Modulators," Optics Express 18.16, Aug. 2, 2010, pp. 16858-16867, http://www.photonics.intec.ugent.be/download/pub_2976.pdf.

Mansoor, R.D., "Analysis of Optical Ring Resonator Add/drop Filters," The 62nd IWCS, Oct. 15, 2013, pp. 471-475, http://iwcs.omnibooksonline.com/data/papers/2013/P-15.pdf.

Qianfan Xu, "Cascaded silicon micro-ring modulators for WDM optical interconnection," Optics Express 14.20, Oct. 2, 2008, pp. 9431-9436, http://nanophotonics.ece.cornell.edu/upload/Cascaded%20silicon%20microring%20modulators%20for%20WDM%20optical%20interconnection.pdf.

Xu et al., "12.5 Gbit/s carrier-injection-based silicon micro-ring silicon modulators", Optics Express, vol. 15, No. 2, 2007, pp. 430-436.

Wojcik et al., "A single Comb laser source for short reach WDM interconnects", PProc. of SPIE vol. 7230, DOI: 10.1117/12.816278, 12 pages.

Titriku et al., "Efficiency modeling of tuning techniques for silicon carrier injection ring resonators", in Proc. IEEE Opt. Interconnects Conf., 2014, pp. 13-14.

Soref et al., "Electrooptical effects in silicon", IEEE Journal of Quantum Electronics, vol. 23, No. 1, Jan. 1987, pp. 123-129.

Rakowski et al., "Low-power, low-penalty, flip-chip integrated, 10Gb/s ring-based 1V CMOS photonics transmitter," in Proc. IEEE Opt. Fiber Commun. Conf./Nat. Fiber Opt. Eng. Conf., 2013.

Moss et al., "A 1.23pJ/b 2.5Gb/s monolithically integrated optical carrier-injection ring modulator and all-digital driver circuit in commercial 45nm SOI", in Proc. IEEE Int. Solid-State Circuits Conf., 2013, pp. 126-127.

Liu et al., "10-Gbps, 5.3-mW optical transmitter and receiver circuits in 40-nm CMOS" IEEE J. Solid-State Circuits, vol. 47, No. 9, Sep. 2012, pp. 2049-2067.

Li et al., "A ring-resonator-based silicon photonics transceiver with bias-based wavelength stabilization and adaptive-power-sensitivity receiver", in Proc. IEEE Int. Solid-State Circuits Conf., 2013, pp. 124-125.

Chen et al., "Hybrid integrated DWDM silicon photonic transceiver with self-adaptive CMOS circuits", in Proc. IEEE Opt. Interconnects Conf. 2013, pp. 122-123.

(56) References Cited

OTHER PUBLICATIONS

Buckwalter et al., "A monolithic 25-Gb/s transceiver with photonic ring modulators and Ge detectors in a 130-nm CMOS SOI process", IEEE J. Solid-State Circuits, vol. 47, No. 6, Jun. 2012, pp. 1309-1322.

\* cited by examiner

RING-RESONATOR MODULATION OF AN OPTICAL SIGNAL

STATEMENT OF GOVERNMENT INTEREST

This invention was made with government support under Contract No. H98230-14-3-0011, awarded by the Maryland Procurement Office. The government has certain rights in the invention.

BACKGROUND

The computational performance expectations set by the information technology industry will soon require an entirely new approach to interconnect architectures and implementations. In particular, many communication applications that implement large transfers of data will require larger warehouse scale datacenters with unprecedented levels of main memory capacity interconnected by high performance fabrics with an aggregate bandwidth capability in the Exabyte per second range. The physics of conventional electrical interconnect using wired connections cannot scale to meet this demand without prohibitive cost and spatial requirements.

DETAILED DESCRIPTION

Figure 1:
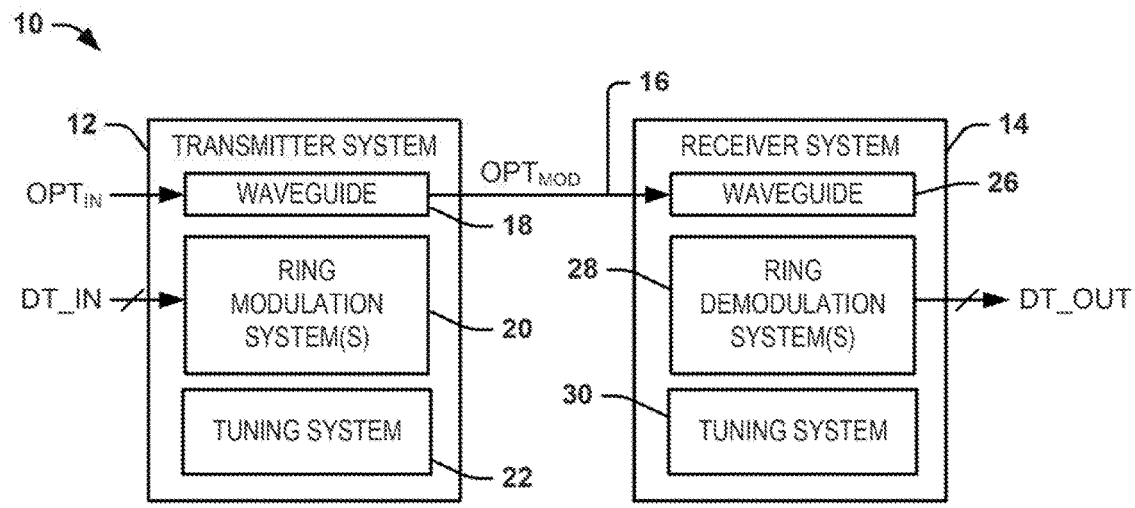
FIG. 1 illustrates an example of an optical communication system.

FIG. 1 illustrates an example of an optical communication system 10. The optical communication system 10 can be implemented in any of a variety of optical communications applications to transmit data at very high bandwidths. The optical communication system 10 includes a transmitter system 12 and a receiver system 14 that are coupled by an optical transmission medium 16. As an example, the optical transmission medium 16 can be configured as any of a variety of different types of optical transmission media, such as an optical fiber (e.g., fiber optic cable), waveguide, or a variety of other media through which an optical signal can propagate. As an example, the optical communication system 10 can be implemented as an optical interconnect system for optical communication between separate electronic devices.

The transmitter system 12 is configured to receive and modulate an optical signal $OPT_{IN}$ based on one or more input data signals DT_IN, and to provide the modulated optical signal, demonstrated in the example of FIG. 1 as an optical signal $OPT_{MOD}$, to the receiver system 14. As an example, the transmitter system 12 can be configured to implement wavelength division multiplexing (e.g., dense wavelength division multiplexing (DWDM)) in modulating the optical signal $OPT_{IN}$. The receiver system 14 is thus configured to receive the modulated optical signal $OPT_{MOD}$ and to demodulate the modulated optical signal $OPT_{MOD}$ to provide one or more data output signals, demonstrated in the example of FIG. 1 as output data signals DT_OUT.

The transmitter system 12 includes a waveguide 18 that is configured to receive the optical signal $OPT_{IN}$. As an example, the optical signal $OPT_{IN}$ can be generated as a multi-wavelength optical signal, such as via a single comb light source. Thus, the optical signal $OPT_{IN}$ can be provided as multiple narrow-spectrum and low-noise laser channels that are generated substantially simultaneously by the single comb light source. Alternatively, the optical signal $OPT_{IN}$ can be generated via a laser bank (e.g., a distributed feedback (DFB) laser bank). The transmitter system 12 also includes one or more ring modulation systems 20 that are configured to modulate the optical signal $OPT_{IN}$ propagating in the waveguide 18 based on the input data signal(s) DT_IN.

As an example, each of the ring modulation system(s) 20 can include a ring resonator (e.g., micro-ring) that is optically coupled (e.g., photonically coupled) to the waveguide 18 and has a radius corresponding to a resonant frequency of a given one wavelength of the optical signal $OPT_{IN}$. Thus, the ring resonator of the respective one of the ring modulation system(s) 20 is configured to resonate the respective wavelength of the optical signal $OPT_{IN}$ in response to the input data signal(s) DT_IN to modulate the optical signal $OPT_{IN}$ by time-wise removing the respective wavelength from the optical signal $OPT_{IN}$. For example, the input data signal(s) DT_IN can be provided via a PIN diode to provide carrier injection in the ring resonator to provide optical coupling between the respective ring resonator and the waveguide to facilitate modulation with respect to the respective wavelength. As an example, the transmitter system 12 can include a plurality of ring modulation systems 20 that each includes a ring resonator of a distinct radius relative to the others, such that a set of cascaded ring resonators can allow for high-bandwidth, low-latency, and energy-efficient data communication. Therefore, the modulated optical signal $OPT_{MOD}$ can correspond to the optical signal $OPT_{IN}$ that is modulated via the input data signal(s) DT_IN.

In the example of FIG. 1, the transmitter system 12 also includes a tuning system 22. The ring resonators in each of the ring modulation system(s) 20 can be rendered especially susceptible to fabrication variations and environmental fluctuations based on specific wavelength-selectivity. Therefore, the tuning system 22 can be implemented to substantially mitigate wavelength drifts that can occur with respect to each of the ring modulation system(s) 20, such as resulting from fabrication variations and/or environmental fluctuations (e.g., temperature).

As an example, the tuning system 22 can be configured to implement at least one of bias tuning and thermal tuning. For example, the tuning system 22 is configured to monitor an intensity of the portion of the optical signal resonating in the ring resonators associated with the respective one of the ring modulation system(s) 20, and to adjust a bias signal (e.g., a substantially constant DC bias current) associated with a modulation amplifier that is configured to provide the respective input data signal DT_IN (e.g., via the PIN diode to provide carrier injection). Thus, the tuning system 22 can provide rapid tuning mechanisms to implement blue-shifts of the respective wavelength of each of the ring resonators of the respective ring modulation system(s) 20 at substantially low power consumption. In addition, the tuning system 22 can also include other tuning mechanisms, such as thermal tuning, to provide greater tuning flexibility.

The receiver system 14 includes a waveguide 26 that is configured to receive the modulated optical signal $OPT_{MOD}$. The receiver system 14 also includes one or more ring demodulation systems 26 that are configured to demodulate the modulated optical signal $OPT_{MOD}$ propagating in the waveguide 26 to provide the output data signal(s) DT_OUT.

As an example, each of the ring demodulation system(s) 26 can include a ring resonator (e.g., micro-ring) that is optically coupled (e.g., photonically coupled) to the waveguide 26 and has a radius corresponding to a resonant frequency of a given one wavelength of the modulated optical signal $OPT_{MOD}$. Thus, the ring resonator of the respective one of the ring demodulation system(s) 26 is configured to resonate the respective wavelength of the modulated optical signal $OPT_{MOD}$ to provide the respective output data signal(s) DT_OUT. As an example, the receiver system 14 can include a plurality of ring demodulation systems 26 that each includes a ring resonator of a distinct radius relative to the others, such that a set of cascaded ring resonators can allow for high-bandwidth, low-latency, and energy-efficient data communication based on a single optical signal $OPT_{IN}$.

As an example, one of the ring modulation system(s) 20 can be configured to modulate timing data onto the modulated optical signal $OPT_{MOD}$ via one of the respective wavelengths to implement "clock-forwarding". Therefore, the single wavelength of the modulated optical signal $OPT_{MOD}$ in the clock-forwarding implementation can provide timing information for the demodulation of the remaining one or more input data signals DT_IN from the modulated optical signal $OPT_{MOD}$ (e.g., with respect to receiver-side data retiming and de-serialization). Therefore, the timing data for demodulating the modulated optical signal $OPT_{MOD}$ can be included in the modulated optical signal $OPT_{MOD}$ itself. Such a clock-forwarding implementation can consume less power and chip area relative to other implementations, such as a continuously running clock-and-data recovery (CDR) approach, because it only requires periodic training to optimize the receiver sampling position. As another example, the clock-forwarding implementation can achieve efficient receiver-side clock generation and sufficient jitter tracking of the incoming data to achieve the desired bit-error rate (BER). Therefore, the clock-forwarding implementation can offer the potential for improved high-frequency jitter tolerance with minimal jitter amplification due to the clock and data signals (e.g., the one or more input data signals DT_IN in the modulated optical signal $OPT_{MOD}$) experiencing substantially the same delay over a common low-dispersive optical channel (e.g., the modulated optical signal $OPT_{MOD}$).

In the example of FIG. 1, the receiver system 14 also includes a tuning system 30 that can correspond, respectively, to the at least one ring demodulation system 28. As described previously, ring resonators, such as the ring resonators in each of the ring demodulation system(s) 28, can be rendered especially susceptible to fabrication variations and environmental fluctuations based on specific wavelength-selectivity. Therefore, the tuning system 30 can be implemented to substantially mitigate wavelength drifts that can occur with respect to the ring demodulation system(s) 28, such as resulting from fabrication variations and/or environmental fluctuations (e.g., temperature). The tuning system 30 can operate substantially similar to the tuning system 22 of the transmitter system 12, and can also include an activity detector that can indicate optical data traffic on the optical transmission medium 16 to indicate when tuning is to occur, as described in greater detail herein.

As described previously, the optical communication system 10 can be implemented as an optical interconnect system for optical communication between separate electronic devices. For example, the transmitter system 12 and/or the receiver system 14 of the optical communication system 10 can be implemented on an integrated circuit (IC) chip, or as a combination of chips. As another example, the optical communication system 10 can be implemented in a transceiver system, such that the transmitter system 12 and the receiver system 14 are not coupled via the optical transmission medium 16, but are instead both arranged on a single IC chip to respectively transmit and receive modulated optical signals individually. For example, the optical communication system 10 can be implemented as a transceiver IC that includes a complementary metal-oxide semiconductor (CMOS) chip that is flip-chip bonded to a photonic chip to provide optical communication capability. Accordingly, the optical communication system 10 can be implemented in a variety of ways.

Figure 2:
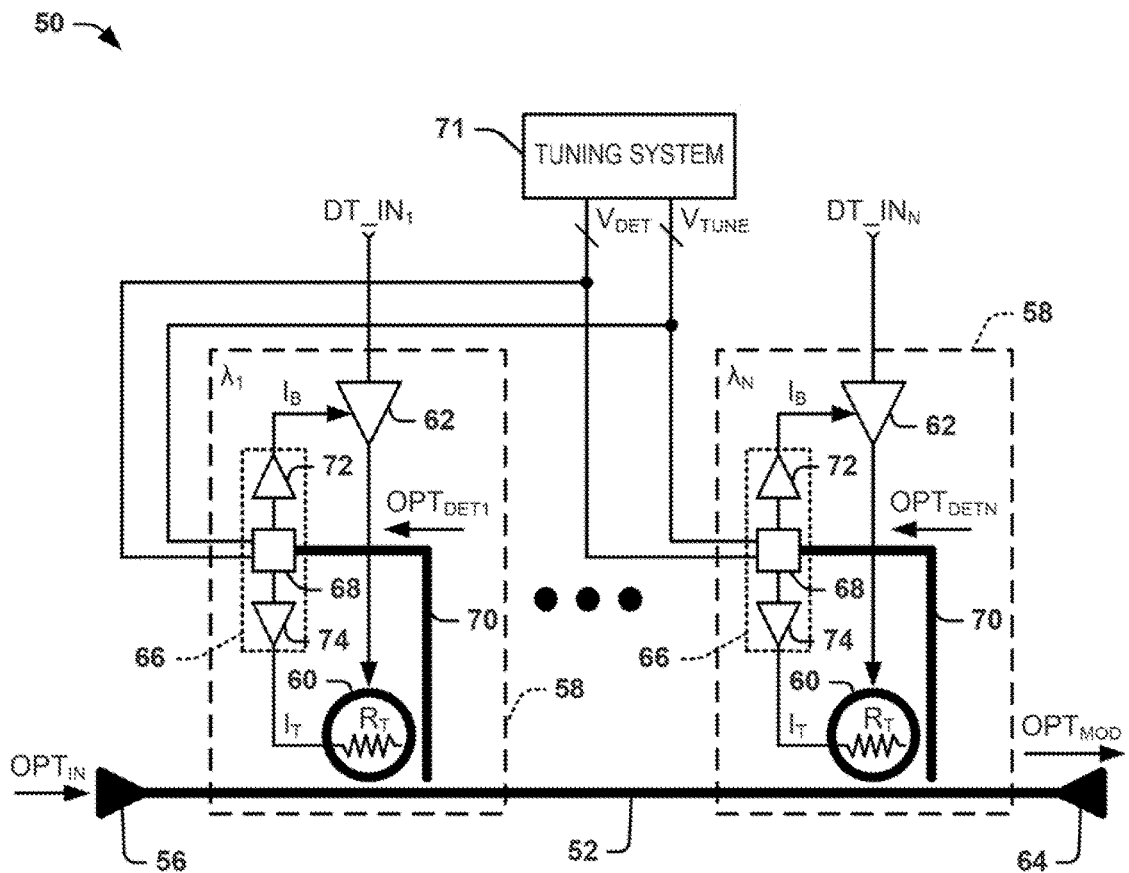
FIG. 2 illustrates an example of an optical transmitter system.

FIG. 2 illustrates an example of an optical transmitter system 50. The optical transmitter system 50 can correspond to the optical transmitter system 12 in the example of FIG. 1. Therefore, reference is to be made to the example of FIG. 1 in the following description of the example of FIG. 2.

The optical transmitter system 50 includes a waveguide 52 that is configured to receive the optical signal $OPT_{IN}$ at an optical coupler 56. As an example, the optical signal $OPT_{IN}$ can be generated as a multi-wavelength optical signal, such as via a single comb light source. The optical transmitter system 50 also includes a plurality N of ring modulation systems 58, where N is a positive integer, that are configured to modulate the optical signal $OPT_{IN}$ propagating in the waveguide 52 based on a respective plurality N of input data signal(s) DT_IN. In the example of FIG. 2, the ring modulation systems 58 are demonstrated as labeled $\lambda_1$ through $\lambda_N$ corresponding to separate distinct wavelengths $\lambda_1$ through $\lambda_N$ that can be modulated in a DWDM modulation scheme. Similarly, the input data signals are demonstrated in the example of FIG. 2 as DT_IN1 through DT_INN corresponding to the modulation of the respective wavelengths $\lambda_1$ through $\lambda_N$ of the ring modulation systems 58.

In the example of FIG. 2, each of the ring modulation systems 58 includes a ring resonator (e.g., micro-ring) 60 that is optically coupled (e.g., photonically coupled) to the waveguide 52. Each of the ring resonators 60 can have a radius corresponding to a resonant frequency of the respective one of the wavelengths $\lambda_1$ through $\lambda_N$ of the optical signal $OPT_{IN}$. Thus, a given ring resonator 60 is configured to resonate the respective one of the wavelengths $\lambda_1$ through $\lambda_N$ of the optical signal $OPT_{IN}$ in response to the respective input data signals DT_IN1 through DT_INN to modulate the optical signal $OPT_{IN}$. In the example of FIG. 2, each of the input data signals DT_IN1 through DT_INN are provided to a modulation amplifier 62 (e.g., a CMOS driver) that is configured to provide carrier injection into the respective ring resonator 60 (e.g., via a PIN diode) to provide optical coupling between the respective ring resonator 60 and the waveguide 52 to facilitate modulation with respect to the respective one of the wavelengths $\lambda_1$ through $\lambda_N$. Therefore, the modulated optical signal $OPT_{MOD}$ corresponding to the optical signal $OPT_{IN}$ that is modulated via the input data signals DT_IN1 through DT_INN is provided from an optical coupler 64, such as to the receiver system 14.

As described previously, the modulation amplifier 62 is configured to provide carrier injection into the respective ring resonator 60 via a PIN diode to provide optical coupling between the respective ring resonator 60 and the waveguide 52. The carrier injection modulation of the ring resonator 60 can result from a forward-biasing of the respective PIN diode. Thus, the forward-biased carrier-injection modulation of the optical signal $OPT_{IN}$ can result in a larger refractive-index change of the respective ring resonator 60 under forward-bias, such as relative to a carrier depletion modulation scheme. Additionally, the injection of free electrons and holes into the respective intrinsic waveguide region of the ring resonator 60 to overlap with the optical mode of the optical signal $OPT_{IN}$ in the waveguide 52 can result in a substantial mitigation of optical loss to provide more efficient operation of the modulation of the optical signal $OPT_{IN}$, as opposed to a carrier depletion modulation scheme. Therefore, the modulation amplifier 62 can provide a more efficient manner of modulation of the optical signal $OPT_{IN}$ than typical depletion-type modulation schemes.

Each of the ring modulation systems 58 includes a local tuning control system 66. The local tuning control system 66 includes a feedback control system 68 that is configured to receive a detection optical signal $OPT_{DET}$ that is provided via a tuning waveguide 70 that is optically coupled to the respective ring resonator 58. The feedback control system 68 can include a photodetector that is configured to generate a detection voltage $V_{DET}$ that is associated with the intensity of the detection optical signal $OPT_{DET}$. Thus, the detection voltage $V_{DET}$ can be indicative of intensity of the respective one of the wavelengths $\lambda_1$ through $\lambda_N$. The detection voltage $V_{DET}$ can be provided to a tuning system 71 (e.g., corresponding to the tuning system 22 in the example of FIG. 1). In response, the tuning system 71 can provide at least one tuning voltage, demonstrated in the example of FIG. 2 as a voltage $V_{TUNE}$ that can be associated with at least one of bias tuning or thermal tuning for tuning the respective ring resonator 58. For example, the tuning system 71 can be configured to compare the detection voltage $V_{DET}$ with a variable reference voltage $V_{REF}$, such that the feedback control system 68 can tune the ring modulation system 58 in response to the comparison to substantially maximize an extinction ratio of the modulated optical signal $OPT_{MOD}$, as described in greater detail herein. Thus, the feedback control system 68 can tune the respective ring modulation system 58 based on the tuning voltage $V_{TUNE}$ to substantially mitigate wavelength drifts that can occur with respect to the respective ring resonator 60, such as resulting from fabrication variations and/or environmental fluctuations (e.g., temperature).

In the example of FIG. 2, the local tuning control system 66 includes a first tuning driver 72 that can provide a bias current $I_B$ to the modulation amplifier 62. The feedback control system 68 can thus control an amplitude of the bias current $I_B$ based on the tuning voltage $V_{TUNE}$ in a feedback manner. Therefore, the local tuning control system 66 can provide a rapid tuning mechanism via the first tuning driver 72 to implement blue-shift of the respective one of the wavelengths $\lambda_1$ through $\lambda_N$ of the ring resonator 60 of the respective one of the ring modulation systems 58 at substantially low power consumption.

In addition, the local tuning control system 66 also includes a second tuning driver 74 that can provide a thermal current $I_T$ to a resistive heating element, demonstrated as a resistor $R_T$ (e.g., a 1 kΩ resistor). The feedback control system 68 can thus control an amplitude of the thermal current $I_T$ based on the tuning voltage $V_{TUNE}$ in a feedback manner. Therefore, in addition to providing rapid blue-shift tuning via the bias current $I_B$, the local tuning control system 66 can provide a thermal tuning mechanism via the second tuning driver 74 to implement red-shift of the respective one of the wavelengths $\lambda_1$ through $\lambda_N$ of the ring resonator 60 of the respective one of the ring modulation systems 58.

Accordingly, the local tuning control system 66 can provide a flexible tuning mechanism based on the combination of the bias tuning implemented via the first tuning driver 72 and the thermal tuning implemented via the second tuning driver 74.

Figure 3:
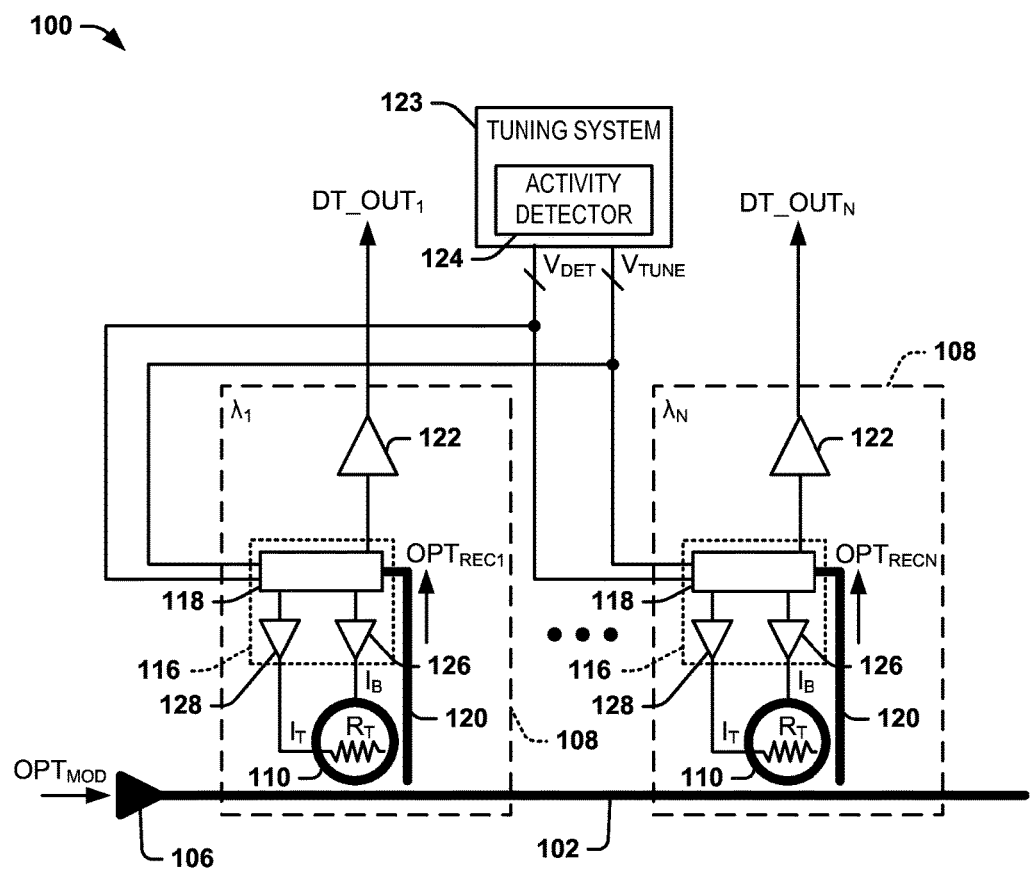
FIG. 3 illustrates an example of an optical receiver system.

FIG. 3 illustrates an example of an optical receiver system 100. The optical receiver system 100 can correspond to the optical receiver system 14 in the example of FIG. 1. In addition, the optical receiver system 100 can be configured to receive the modulated optical signal $OPT_{MOD}$ from the optical transmitter system 50 in the example of FIG. 2. Therefore, reference is to be made to the example of FIGS. 1 and 2 in the following description of the example of FIG. 3.

The optical receiver system 100 includes a waveguide 102 that is configured to receive the modulated optical signal $OPT_{MOD}$ at an optical coupler 106, such as received from the optical transmitter system 12 (e.g., the optical transmitter system 50). The optical receiver system 100 also includes a plurality N of ring demodulation systems 108, where N is a positive integer, that are configured to demodulate the modulated optical signal $OPT_{MOD}$ propagating in the waveguide 102 to generate a respective plurality N of output data signal(s) DT_OUT. In the example of FIG. 3, the ring demodulation systems 108 are demonstrated as labeled $\lambda_1$ through $\lambda_N$ corresponding to separate distinct wavelengths $\lambda_1$ through $\lambda_N$ that can be modulated in a DWDM modulation scheme. Similarly, the output data signals are demonstrated in the example of FIG. 3 as $DT\_OUT_i$ through $DT\_OUT_N$ corresponding to the demodulation of the respective wavelengths $\lambda_1$ through $\lambda_N$ via the ring demodulation systems 108.

In the example of FIG. 3, each of the ring demodulation systems 108 includes a ring resonator (e.g., micro-ring) 110 that is optically coupled (e.g., photonically coupled) to the waveguide 102. Each of the ring resonators 110 can have a radius corresponding to a resonant frequency of the respective one of the wavelengths $\lambda_1$ through $\lambda_N$ of the modulated optical signal $OPT_{MOD}$. Thus, a given ring resonator 110 is configured to resonate the respective one of the wavelengths $\lambda_1$ through $\lambda_N$ of the modulated optical signal $OPT_{MOD}$ in response to the respective one of the wavelengths $\lambda_1$ through $\lambda_N$ being present in the modulated optical signal $OPT_{MOD}$.

In the example of FIG. 3, each of the ring demodulation systems 108 includes a receiver control system 116. The receiver control system 116 includes a photodetector control system 118 that is provided a received optical signal $OPT_{REC}$ via a receiver waveguide 120 that is optically coupled to the respective ring resonator 110. The photodetector control system 118 can thus detect the presence of the respective one of the wavelengths $\lambda_1$ through $\lambda_N$, and can provide a corresponding one of the output data signals $DT\_OUT_i$ through $DT\_OUT_N$ via an output amplifier 122 (e.g., a CMOS receiver amplifier). Accordingly, the ring demodulation systems 108 can demodulate the modulated optical signal $OPT_{MOD}$ to provide the set of output data signals $DT\_OUT_i$ through $DT\_OUT_N$ corresponding respectively to the wavelengths $\lambda_1$ through $\lambda_N$.

In addition, the receiver control system 116 can monitor an intensity of the received optical signal $OPT_{REC}$ that can be associated with an intensity of the respective one of the wavelengths $\lambda_1$ through $\lambda_N$ via the photodetector control system 118. Thus, the photodetector control system 118 can tune the respective ring demodulation system 108 to substantially mitigate wavelength drifts that can occur with respect to the respective ring resonator 110, such as resulting from fabrication variations and/or environmental fluctuations (e.g., temperature). As an example, the photodetector control system 118 can convert an intensity of the received optical signal $OPT_{REC}$ into a detection voltage $V_{DET}$ that can be indicative of intensity of the respective one of the wavelengths $\lambda_1$ through $\lambda_N$ in the modulated optical signal $OPT_{MOD}$. The detection voltage $V_{DET}$ can be provided to a tuning system 123 (e.g., corresponding to the tuning system 30 in the example of FIG. 1). In response, the tuning system 123 can provide at least one tuning voltage, demonstrated in the example of FIG. 3 as a voltage $V_{TUNE}$ that can be associated with at least one of bias tuning or thermal tuning for tuning the respective ring resonator 110. For example, the tuning system 123 can be configured to compare the detection voltage $V_{DET}$ with a variable reference voltage $V_{REF}$, such that the photodetector control system 118 can tune the ring modulation system 110 in response to the comparison to substantially maximize an extinction ratio of the modulated optical signal $OPT_{MOD}$, as described in greater detail herein.

In the example of FIG. 3, the tuning system 123 includes an activity detector 124 that is configured to indicate the presence of optical data traffic on the waveguide 102 to indicate when tuning is to occur. For example, due to presence of redundant laser channels in the modulated optical signal $OPT_{MOD}$, the tuning system 123 can ensure that a given one of the ring resonators 110 is tuned to an active wavelength. Thus, the activity detector 124 can be configured to detect a pattern on the locked laser wavelength associated with the modulated optical signal $OPT_{MOD}$. For example, if a given wavelength is detected, but the activity detector 124 does not detect demodulation (e.g., data switching), the tuning system 123 does not attempt to tune the wavelength associated with the given optical ring demodulation system 108. In other words, if a wavelength is detected but is not associated with data demodulation, the tuning system 123 assumes that the wavelength is associated with an unmodulated channel and passes the wavelength. Therefore, the activity detector 124 can differentiate between active data channels for a given ring demodulation system 108, such as to implement tuning of the ring demodulation system 108 when necessary based on the numerous wavelengths associated with the modulated optical signal $OPT_{MOD}$.

In the example of FIG. 3, the receiver control system 116 includes a first tuning driver 126 that can provide a bias current $I_B$ to the ring resonator 110. The photodetector control system 118 can thus control an amplitude of the bias current $I_B$ based on the tuning voltage $V_{TUNE}$ to affect the doping of the ring resonator 110, and thus tune the respective one of the wavelengths $\lambda_1$ through $\lambda_N$ of the ring resonator 110. Therefore, the receiver control system 116 can provide a rapid tuning mechanism via the first tuning driver 126 to implement blue-shift of the respective one of the wavelengths $\lambda_1$ through $\lambda_N$ of the ring resonator 110 of the respective one of the ring demodulation systems 108 at substantially low power consumption.

In addition, the receiver control system 116 includes a second tuning driver 128 that can provide a thermal current $I_T$ to a resistive heating element, demonstrated as a resistor $R_T$. The photodetector control system 118 can thus control an amplitude of the thermal current $I_T$ based on the tuning voltage $V_{TUNE}$. Therefore, the receiver control system 116 can provide a thermal tuning mechanism via the tuning driver 122 to implement red-shift of the respective one of the wavelengths $\lambda_1$ through $\lambda_N$ of the ring resonator 110 of the respective one of the ring demodulation systems 108. Accordingly, the receiver control system 116 can provide a flexible tuning mechanism based on the combination of the bias tuning implemented via the first tuning driver 126 and the thermal tuning implemented via the second tuning driver 128.

Figure 4:
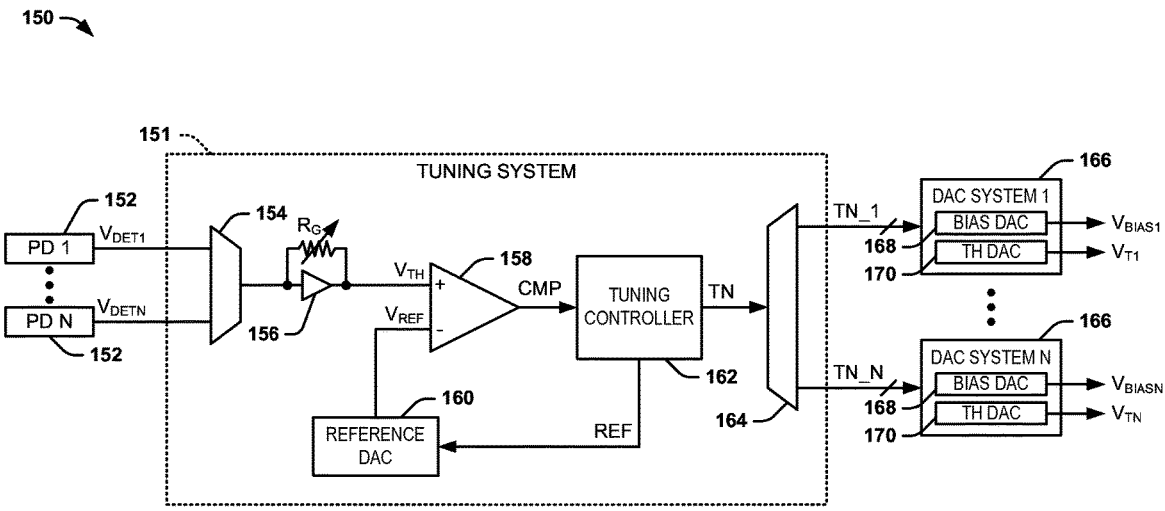
FIG. 4 illustrates an example of a tuning system.

FIG. 4 illustrates an example diagram 150 of a tuning arrangement. The diagram 150 includes a tuning system 151 that can correspond to one of the tuning systems 22 in the example of FIG. 1, or one of the tuning systems 71 in the example of FIG. 2. Therefore, reference is to be made to the examples of FIGS. 1 and 2 in the following description of the example of FIG. 4. Additionally, while the tuning system 151 is described herein as relating to the tuning systems 22 and 71 in the examples of FIGS. 1 and 2, it is to be understood that the tuning system 151 could likewise correspond to the tuning systems 30 and 123 in the examples of FIGS. 1 and 3, respectively.

The diagram 150 demonstrates a plurality N of photodetectors 152 (e.g., photodiodes), demonstrated as PD 1 through PD N, that are each associated with a given one of the ring modulation systems 58, such as being included in the local tuning control system 66 (e.g., the feedback control system 68). Therefore, each of the photodetectors 152 can monitor a given one of the detection optical signals $OPT_{DET}$ corresponding to a respective one of the wavelengths $\lambda_1$ through $\lambda_N$. Thus, the photodetectors 152 can generate a respective set of detection voltages $V_{DET1}$ through $V_{DETN}$ that have amplitudes that are indicative of an intensity of the respective detection optical signals $OPT_{DET1}$ through $OPT_{DETN}$ corresponding to the respective wavelengths $\lambda_1$ through $\lambda_N$. The detection voltages $V_{DET1}$ through $V_{DETN}$ are provided to a multiplexer 154 that is configured to select a given one of the detection voltages $V_{DET1}$ through $V_{DETN}$ for comparison.

The selected one of the detection voltages $V_{DET1}$ through $V_{DETN}$, demonstrated as a detection voltage $V_{DET}$, is provided to a trans-inductance amplifier (TIA) 156 with a parallel variable gain resistor $R_G$ that is configured to convert the detection voltage $V_{DET}$ to a thermal voltage $V_{TH}$ that is associated with an ambient temperature of the ring resonator 60 associated with the respective one of the ring modulation systems 58. The tuning system 151 also includes a reference comparator 158 that is configured to compare the thermal voltage $V_{TH}$ that is associated with the detection voltage $V_{DET}$ with a predetermined reference voltage $V_{REF}$. In the example of FIG. 4, the reference voltage $V_{REF}$ is generated via a reference digital-to-analog converter (DAC) 160. The reference comparator 158 generates a signal CMP that is indicative of the comparison.

In the example of FIG. 4, the reference comparator 158 receives the thermal voltage $V_{TH}$ at a non-inverting input and the reference voltage $V_{REF}$ at an inverting input. Thus, the signal CMP is logic-high in response to the thermal voltage $V_{TH}$ being approximately equal to or greater than the reference voltage $V_{REF}$. As an example, the tuning controller 162 can be configured to monitor a sequence of 0s and 1s associated with the signal CMP to determine the relative amplitude of the thermal voltage $V_{TH}$ and the reference voltage $V_{REF}$, such as based to compensate for noise that may affect the optical transmitter system 50. Additionally or alternatively, the reference comparator 158 can include a voltage offset and/or filter(s) to compensate for noise associated with the reference comparator 158.

The signal CMP is provided to a tuning controller 162 that is configured to control a digital tuning signal TN and a digital reference signal REF that is provided to the reference DAC 160 to generate the reference voltage $V_{REF}$ based on the digital reference signal REF. The digital tuning signal TN can correspond to a digital signal associated with an amplitude of a bias tuning voltage $V_{BIAS}$ and a thermal tuning voltage $V_T$ that can be associated, respectively, with the amplitudes of the bias current $I_B$ and the thermal current $I_T$. For example, the digital tuning signal TN can be arranged as a multi-bit (e.g., 9-bit) segmented digital signal. The digital tuning signal is provided to a demultiplexer 164 that is configured to provide the digital tuning signal TN as one of a plurality N of digital tuning signals, demonstrated in the example of FIG. 4 as digital tuning signals TN_1 through TN_N. Thus, the digital tuning signals TN_1 through TN_N correspond to the digital tuning signal TN selected for a given one of the ring modulation systems 58. As an example, the digital tuning signal TN, and thus the digital tuning signals TN_1 through TN_N by extension, can be arranged as separate digital signals for each of the bias tuning voltage $V_{BIAS}$ and the thermal tuning voltage $V_T$.

The digital tuning signals TN_1 through TN_N are provided to a respective plurality N of DAC systems 166 that each be associated with a given one of the ring modulation systems 58, such as being included in the local tuning control system 66 (e.g., the feedback control system 68). Each of the DAC systems 166 includes a bias DAC 168 and a thermal DAC 170, demonstrated in the example of FIG. 4 as BIAS DAC and TH DAC, respectively. The bias DAC 168 of each of the DAC systems 166 is configured to generate the bias tuning voltage $V_{BIAS}$ in response to the digital tuning signal TN, and the thermal DAC 170 of each of the DAC systems 166 is configured to generate the thermal tuning voltage $V_T$ in response to the digital tuning signal TN. The bias tuning voltage $V_{BIAS}$ and the thermal tuning voltage $V_T$ can collectively correspond, for example, to the tuning voltage $V_{TUNE}$ in the example of FIG. 2. As an example, the digital tuning signal TN can include coarse and fine increments associated with the amplitude of the bias tuning voltage $V_{BIAS}$, such that the bias DAC 168 can utilize a coarse bit (e.g., 3-bit) non-linear R-string DAC to match the PIN diode I-V characteristics, and a fine bit (e.g., 6-bit) linear R-2R DAC to achieve fine tuning.

As another example, the digital tuning signal TN can include a predetermined number of bits that can correspond to an amplitude of the thermal tuning voltage $V_T$ to provide a given ambient temperature to the ring resonator 60 of the respective one of the ring modulation systems 58. Thus, the digital tuning signal TN can change to decrease an amplitude of the thermal tuning voltage $V_T$, and thus the thermal current $I_T$, through the resistive heating element $R_T$ based on the comparison of the thermal voltage $V_{TH}$ with the reference voltage $V_{REF}$ to maintain a substantially constant ambient temperature associated with the ring resonator 60. As an example, the resonance wavelength of the ring resonator 60 shifts towards to longer wavelength with the increased temperature due to local thermal heating. As an example, the thermal DAC 170 can be configured as a multi-bit (e.g., 12-bit) A thermal DAC to provide a 2V dynamic range to cover 0.8 nm of wavelength tenability (e.g., based on a 1 kΩ resistance of the resistor $R_T$).

Therefore, based on the separate amplitudes of the bias tuning voltage $V_{BIAS}$ and the thermal tuning voltage $V_T$, and thus the associated bias current IB and thermal current IT, the tuning system 151 can implement a dual-loop tuning algorithm. As an example, based on the comparison of the thermal voltage $V_{TH}$ with the reference voltage $V_{REF}$, the tuning system 151 can first implement bias tuning and then switch control to thermal tuning to complete the tuning if the bias tuning is not successful. The dual-loop tuning can thus allow for rapid tuning within the bias loop range, and minimum power consumption when thermal tuning is activated. As an example, the tuning system 151 can operate substantially similar with respect to each of the bias tuning and the thermal tuning.

For example, the tuning system 151 can initially lock a respective detection voltage $V_{DET}$, and thus the thermal voltage $V_{TH}$, to a substantially conservative value of the reference voltage $V_{REF}$ that maps to a reliable point on an averaged transfer curve. After an initial lock is achieved, the tuning controller 162 can set the digital reference signal REF, and thus the amplitude of the reference voltage $V_{REF}$, as a successful lock point. The tuning controller 162 can thus increase the value of the digital reference signal REF, and thus the amplitude of the reference voltage $V_{REF}$, by an increment to maximize the extinction ratio. Because the tuning controller 162 monitors the optical power via the respective photodetectors 152, the tuning controller 162 can maximize the optical power, as provided via the detection voltage $V_{DET}$, to obtain the maximum extinction ratio. Thus, after a first initial locking, the tuning controller 162 can implement several cycles of locking and increases of the digital reference signal REF, and thus the reference voltage $V_{REF}$, until the tuning controller 162 can no longer lock to a maximum optical power, and thus has achieved a greater than maximum value of the digital reference signal REF. The tuning controller 162 can thus decrease the value of the digital reference signal REF, and thus the reference voltage $V_{REF}$, to the last successful reference level to obtain the final lock point for the possible maximum extinction ratio.

For example, during initial operation of the tuning system 151, the tuning controller 162 can set an initial predetermined low amplitude of the bias tuning voltage $V_{BIAS}$ and/or the thermal tuning voltage $V_T$ and a corresponding predetermined amplitude of the reference voltage $V_{REF}$ via the digital signal REF. The tuning controller 162 can monitor the extinction ratio of the respective one of the wavelengths $\lambda_1$ through $\lambda_N$ based on the comparison of the thermal voltage $V_{TH}$ and the reference voltage $V_{REF}$, as indicated by the signal CMP. The tuning controller 162 can thus iteratively increase the amplitude of the bias tuning voltage $V_{BIAS}$ and/or the thermal voltage $V_T$ (e.g., first the bias tuning voltage $V_{BIAS}$ followed by the thermal voltage $V_T$) via the digital tuning signal TN for a given amplitude of the reference voltage $V_{REF}$ until the thermal voltage $V_{TH}$ is approximately equal to the reference voltage $V_{REF}$, as indicated by the signal CMP.

Upon the thermal voltage $V_{TH}$ being approximately equal to the reference voltage $V_{REF}$, the tuning controller 162 can increase the amplitude of the reference voltage $V_{REF}$ via the digital signal REF, and can again iteratively increase the bias tuning voltage $V_{BIAS}$ and/or the thermal tuning voltage $V_T$ via the digital tuning signal TN until the thermal voltage $V_{TH}$ is again approximately equal to the reference voltage $V_{REF}$, as indicated by the signal CMP. Therefore, the tuning controller 162 can iteratively increase the reference voltage $V_{REF}$ until the tuning controller 162 detects an approximate maximum associated with the extinction ratio associated with the respective one of the wavelengths $\lambda_1$ through $\lambda_N$ based to tune the optical transmitter system 50.

As described previously, the foregoing was described with respect to the optical transmitter system 50. However, it is to be understood that the tuning system 151 can be similarly applicable to the optical receiver system 100 in the example of FIG. 3. For example, the tuning system 151 associated with the optical receiver system 100 can include a resettable peak detector associated with an activity detector (e.g., the activity detector 124) to track the peak optical power of the respective one of the wavelengths $\lambda_1$ through $\lambda_N$. For example, the TIA 156 can include an integrated peak detector that is used to sense the peak power levels for comparison of the thermal voltage $V_{TH}$ with the reference voltage $V_{REF}$. The peak detector, for example, can be connected to a source of an NMOS transistor of the activity detector 124 and can be reset at a substantially lower clock rate (e.g. 100 MHz relative to the 10 Gb/s high-speed modulation speed) for fast tracking of optical power variation associated with the detection voltage $V_{DET}$. Accordingly, the tuning system 123 of the optical receiver system 100 can implement substantially similar tuning as described with respect to the tuning system 151 in the example of FIG. 4 by implementing the activity detector 124.

Figure 5:
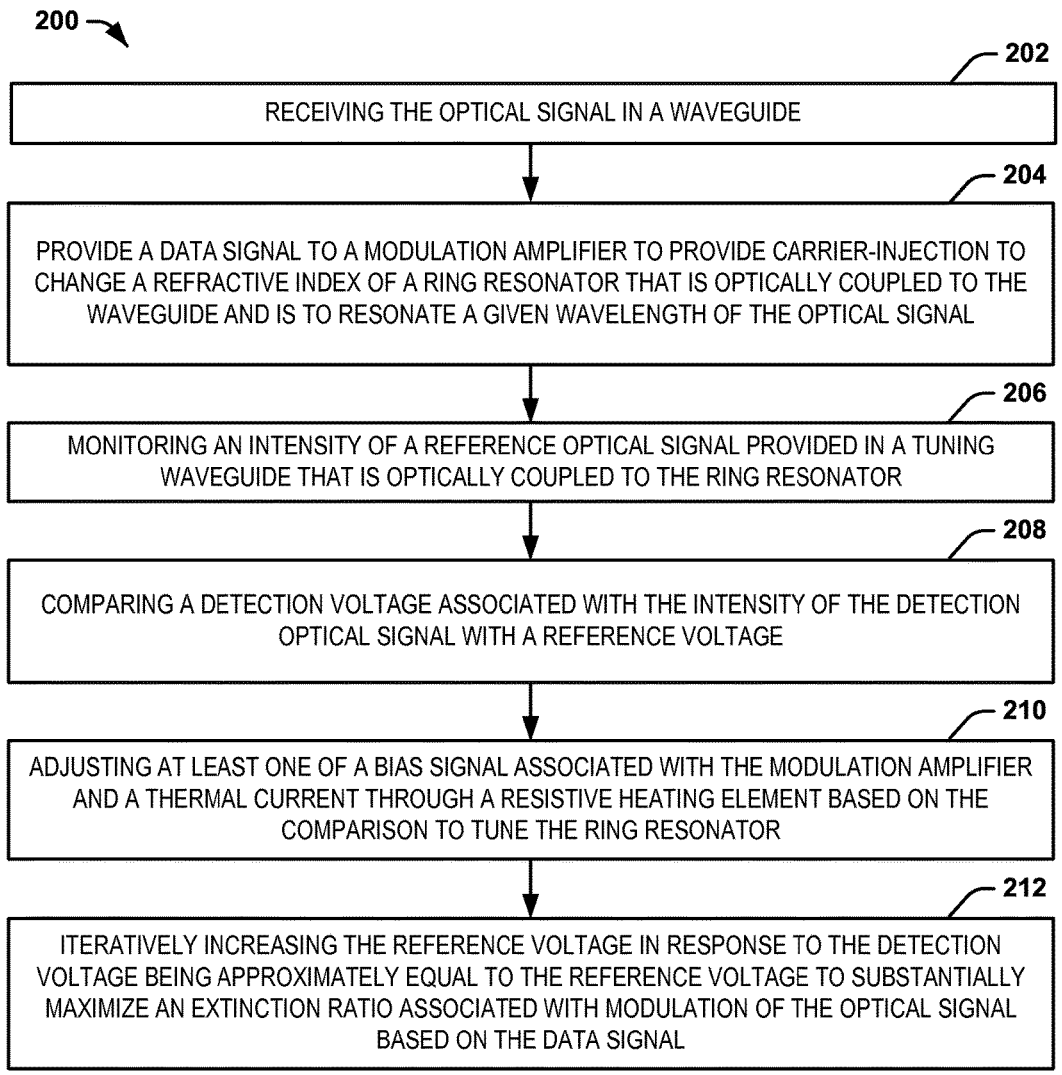
FIG. 5 illustrates an example of a method for modulating an optical signal.

In view of the foregoing structural and functional features described above, an example methodology will be better appreciated with reference to FIG. 5. While, for purposes of simplicity of explanation, the methodology of FIG. 5 is shown and described as executing serially, it is to be understood and appreciated that the present invention is not limited by the illustrated order, as some embodiments could in other embodiments occur in different orders and/or concurrently from that shown and described herein.

FIG. 5 illustrates an example embodiment of a method 200 for modulating an optical signal (e.g., the optical signal $OPT_{IN}$). At 202, the optical signal is received in a waveguide (e.g., the waveguide 18). At 204, a data signal (e.g., the data signal DT_IN) is provided to a modulation amplifier (e.g., the modulation amplifier 62) to provide carrier-injection to change a refractive index of a ring resonator (e.g., the ring resonator 60) that is optically coupled to the waveguide and is to resonate a given wavelength (e.g., one of the wavelengths $\lambda_1$ through $\lambda_N$) of the optical signal. At 206, an intensity of a detection optical signal (e.g., the detection optical signal $OPT_{DET}$) provided in a tuning waveguide (e.g., the tuning waveguide 70) that is optically coupled to the ring resonator is monitored. At 208, a detection voltage (e.g., the detection voltage $V_{DET}$) associated with the intensity of the detection optical signal is compared with a reference voltage (e.g., the reference voltage $V_{REF}$). At 210, at least one of a bias signal (e.g., the bias current $I_B$) associated with the modulation amplifier and a thermal current (e.g., the thermal current $I_T$) through a resistive heating element (e.g., the resistor $R_T$) is adjusted based on the comparison to tune the ring resonator. At 212, the reference voltage is iteratively increased in response to the detection voltage being approximately equal to the reference voltage to substantially maximize an extinction ratio associated with modulation of the optical signal based on the data signal.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An optical transmitter system comprising:
   a waveguide to receive and propagate an optical signal;
   a ring modulation system comprising a ring resonator that is optically coupled to the waveguide and is to resonate a given wavelength of the optical signal in response to an input data signal that is provided to a modulation amplifier to provide carrier injection to change a refractive index of the ring resonator to resonate the given wavelength of the optical signal to modulate the optical signal; and
   a tuning controller associated with the ring modulation system, the tuning controller being to implement iterative feedback tuning of the ring modulation system based on a relative amplitude of an optical intensity of the given wavelength in the ring resonator and a variable reference amplitude to substantially stabilize the ring resonator with respect to the given wavelength,
   wherein the ring modulation system comprises a tuning waveguide that is optically coupled to the ring resonator to propagate a detection optical signal at the given wavelength and a photodetector to generate a detection voltage associated with an intensity of the detection optical signal, wherein the tuning controller comprises a voltage comparator to compare the detection voltage with a reference voltage, such that the tuning controller is to adjust a bias signal associated with the modulation amplifier based on the comparison in an iterative feedback manner,
   wherein the tuning controller is further to set an initial predetermined amplitude of the bias signal that is less than an operational amplitude of the bias signal and to iteratively increase the bias signal based on the comparison until the tuning controller detects that the detection voltage is approximately equal to the reference voltage.

2. The system of claim 1, wherein the tuning controller is further to iteratively increase the reference voltage in response to detecting that the detection voltage is approximately equal to the reference voltage and to iteratively increase the bias signal based on the comparison until the tuning controller detects that the detection voltage is approximately equal to the reference voltage during each iterative increase of the reference voltage until the tuning controller detects that a substantially maximum extinction ratio is achieved.

3. An optical transmitter system comprising:
   a waveguide to receive and propagate an optical signal;
   a ring modulation system comprising a ring resonator that is optically coupled to the waveguide and is to resonate a given wavelength of the optical signal in response to an input data signal that is provided to a modulation amplifier to provide carrier injection to change a refractive index of the ring resonator to resonate the given wavelength of the optical signal to modulate the optical signal; and
   a tuning controller associated with the ring modulation system, the tuning controller being to implement iterative feedback tuning of the ring modulation system based on a relative amplitude of an optical intensity of the given wavelength in the ring resonator and a variable reference amplitude to substantially stabilize the ring resonator with respect to the given wavelength,
   wherein the ring modulation system comprises a tuning waveguide that is optically coupled to the ring resonator to propagate a detection optical signal at the given wavelength and a photodetector to generate a detection voltage associated with an intensity of the detection optical signal, wherein the tuning controller comprises a voltage comparator to compare the detection voltage with a reference voltage, such that the tuning controller is to adjust a bias signal associated with the modulation amplifier based on the comparison in an iterative feedback manner, wherein the ring modulation system comprises a resistive heating element that is provided a thermal voltage to implement thermal tuning of the ring resonator with respect to the given wavelength by decreasing an amplitude of a thermal current through the resistive heating element based on the comparison to maintain a substantially constant ambient temperature associated with the ring resonator.

4. An optical transmitter system comprising:
a waveguide to receive and propagate an optical signal;
a ring modulation system comprising a ring resonator that is optically coupled to the waveguide and is to resonate a given wavelength of the optical signal in response to an input data signal that is provided to a modulation amplifier to provide carrier injection to change a refractive index of the ring resonator to resonate the given wavelength of the optical signal to modulate the optical signal; and
a tuning controller associated with the ring modulation system, the tuning controller being to implement iterative feedback tuning of the ring modulation system based on a relative amplitude of an optical intensity of the given wavelength in the ring resonator and a variable reference amplitude to substantially stabilize the ring resonator with respect to the given wavelength,
wherein the ring modulation system is a first ring modulation system of a plurality of ring modulation systems, each of the plurality of ring modulation systems comprising a respective ring resonator that is optically coupled to the waveguide and is to resonate a respective one of a plurality of wavelengths of the optical signal in response to a respective input data signal that is provided to a respective modulation amplifier to provide carrier injection to change a refractive index of the respective ring resonator to resonate the respective one of the plurality of wavelengths of the optical signal to modulate the optical signal, wherein the tuning controller is to implement iterative feedback tuning of each of the plurality of ring modulation systems based on a relative amplitude of an optical intensity of the respective one of the plurality of wavelengths in the ring resonator and the variable reference amplitude to substantially stabilize the respective ring resonator with respect to the respective one of the plurality of wavelengths.

5. An optical communication system implemented on an integrated circuit (IC) chip comprising:
an optical transmitter system, the optical transmitter system comprising:
a waveguide to receive and propagate an optical signal;
a ring modulation system comprising a ring resonator that is optically coupled to the waveguide and is to resonate a given wavelength of the optical signal in response to an input data signal that is provided to a modulation amplifier to provide carrier injection to change a refractive index of the ring resonator to resonate the given wavelength of the optical signal to modulate the optical signal; and
a tuning controller associated with the ring modulation system, the tuning controller being to implement iterative feedback tuning of the ring modulation system based on a relative amplitude of an optical intensity of the given wavelength in the ring resonator and a variable reference amplitude to substantially stabilize the ring resonator with respect to the given wavelength; and
an optical receiver system, the optical receiver system comprising:
a receiver waveguide to receive and propagate a modulated optical signal;
a ring demodulation system comprising a ring resonator that is optically coupled to the receiver waveguide and is to resonate the given wavelength of the modulated optical signal to provide an output data signal; and
a tuning controller associated with the ring demodulation system and comprising an activity detector to detect the modulated optical signal propagating in the receiver waveguide, the tuning controller being to implement iterative feedback tuning of the ring demodulation system based on a relative amplitude of an optical intensity of the given wavelength in the ring resonator and a variable reference amplitude to substantially stabilize the ring resonator with respect to the given wavelength.

6. The optical communication system of claim 5, wherein the optical receiver system comprises a plurality of ring demodulation systems corresponding to a respective plurality of ring modulation systems associated with the optical transmitter system to transmit the modulated optical signal from the optical transmitter system to the optical receiver system via a plurality of wavelengths, wherein one of the plurality of wavelengths is to transmit timing data from the optical transmitter system to the optical receiver system for demodulating data associated with the modulated optical signal via remaining wavelengths of the plurality of wavelengths.

7. An optical communication system comprising:
an optical transmitter system, the optical transmitter system comprising:
a transmitter waveguide to receive and propagate an optical signal;
a ring modulation system comprising a ring resonator that is optically coupled to the transmitter waveguide and is to resonate a given wavelength of the optical signal in response to an input data signal that is provided to a modulation amplifier to modulate the optical signal; and
a tuning controller associated with the ring modulation system, the tuning controller being to implement iterative feedback tuning of the ring modulation system based on a relative amplitude of an optical intensity of the given wavelength in the ring resonator and a variable reference amplitude to substantially stabilize the ring resonator with respect to the given wavelength;
an optical transmission medium to propagate the modulated optical signal; and
an optical receiver system, the optical receiver system comprising:
a receiver waveguide optically coupled to the transmitter waveguide via the optical transmission medium and being to receive and propagate the modulated optical signal;
a ring demodulation system comprising another ring resonator that is optically coupled to the receiver waveguide and is to resonate the given wavelength of the modulated optical signal to provide an output data signal; and a tuning controller associated with the ring demodulation system and comprising an activity detector to detect the modulated optical signal propagating in the receiver waveguide, the tuning controller being to implement iterative feedback tuning of the ring demodulation system based on a relative amplitude of an optical intensity of the given wavelength in the ring resonator and a variable reference amplitude to substantially stabilize the ring resonator with respect to the given wavelength, wherein the ring modulation system comprises:
a tuning waveguide that is optically coupled to the ring resonator to propagate a detection optical signal at the given wavelength and a photodetector to generate a detection voltage associated with an intensity of the detection optical signal, wherein the tuning controller comprises a voltage comparator to compare the detection voltage with a reference voltage, such that the tuning controller is to adjust at least a thermal current through a resistive heating element associated with the ring resonator based on the comparison in an iterative feedback manner.

* * * * *